3,522,245
4 - OXO - 6 - STYRYL - 3,4;5,6 - TETRAHYDRO - α-PYRON COMPOUNDS, COMPOSITIONS CONTAINING SAME, AND PROCESS OF MAKING SAME
Hans Brinkhoff, Munich, Germany, assignor to Spezialchemie G.m.b.H. & Co., Munich, Germany, a company of Germany
No Drawing. Filed July 26, 1967, Ser. No. 655,992
Int. Cl. C07d 7/06
U.S. Cl. 260—240                10 Claims

ABSTRACT OF THE DISCLOSURE

New therapeutically valuable 4-oxo-6-styryl-3,4;5,6-tetrahydro-α-pyron compounds which may be substituted in the benzene ring by the methylenedioxy or methoxy group and which have pharmacological and therapeutic properties similar to those of kawain.

They are obtained by condensing a γ-bromo aceto acetic acid lower alkyl ester with a corresponding substituted or unsubstituted cinnamic aldehyde in the presence of a metal catalyst such as zinc and in an inert organic solvent such as benzene, preferably at a temperature between about 70° C. and about 80° C.

Methoxylation of said condensation products, for instance, with dimethylsulfate yields kawain and other kava-α-pyron compounds.

The new compounds and pharmaceutical compositions containing same have sedative activity with low toxicity.

---

The present invention relates to an improved process of producing kawain and similar compounds of the α-pyron series and more particularly to a process of producing important intermediates useful in the synthesis of kawain and the like compounds, namely 4-oxo-6-styryl-3,4;5,6-tetrahydro-α-pyrones, to such compounds, and to their use in therapy.

Kawain is 4-methoxy-6-styryl-5,6-dihydro-α-pyron of Formula I:

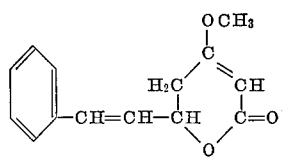

I

Kawain and similar lactones or α-pyron compounds have been prepared, for instance, from extracts of the roots and other parts of the plant Piper methysticum, also known as Radix Kava-Kava, such as methysticin, i.e. 4-methoxy-6-(3′,4′-methylenedioxy styryl) - 5,6-hydro-α-pyron, dihydrokawain, i.e. 4-methoxy-6-phenyl ethyl-5,6-dihydro-α-pyron, dihydromethysticin, i.e. 4-methoxy-6-(3′,4′-methylenedioxy phenylethyl)-5,6-dihydro-α-pyron, yangonin, i.e. 4-methoxy-6-(4′-methoxy styryl)-α-pyron, 7,8-dihydro-5,6-dehydrokawain, i.e. 4-methoxy-6-phenyl ethyl-α-pyron and others. Kawain and methysticin have been synthetized by Kostermann "Recueil" vol. 70, pp. 79–82 (1951) and according to U.S. Pat. No. 2,870,164, by condensing γ-bromo-β-methoxy crotonic acid ethyl ester of Formula II

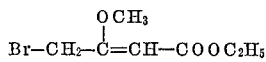

II with cinnamic aldehyde of Formula III

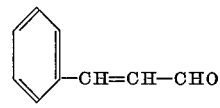

III or with 3,4-methylenedioxy cinnamic aldehyde according to the Reformatzky reaction in the presence of zinc. Kawain or methysticin are obtained from the condensation mixture by decomposition of the condensation product by means of ammonium chloride. However, this process is rather difficult to carry out, the starting material, the γ-bromo-β-methoxy crotonic acid ester, is hard to obtain, the resulting α-pyron compounds are rather impure and can be purified with difficulty only, and the yields are unsatisfactory.

It is one object of the present invention to provide a simple and advantageous process of producing 6-styryl-5,6-dihydro-α-pyron compounds in a surprisingly high yield.

Another object of the present invention is to provide a simple and effective process of producing kawain and other kawain-α-pyron compounds.

A further object of the present invention is to provide new and valuable 6-styryl-3,4;5,6-tetrahydro-α-pyron compounds which are useful intermediate in the production of kawain and other kawain-α-pyron compounds.

Still another object of the present invention is to provide therapeutic compositions containing such new and valuable 6-styryl-3,4;5,6-tetrahydro-α-pyron compounds.

Other objects of the present invention and advantageous features thereof will become apparent as the description proceeds.

In principle the process of producing kawain and the like 6-styryl-3,4-dihydro-α-pyron compounds according to the present invention comprises the condensation of a γ-bromo aceto acetic acid ester with substituted or unsubstituted cinnamic aldehyde in the presence of zinc followed by methoxylation. The reaction proceeds according to the following equation scheme:

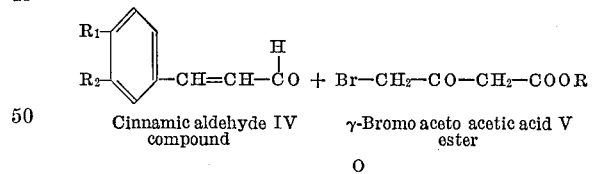

Cinnamic aldehyde IV compound        γ-Bromo aceto acetic acid V ester

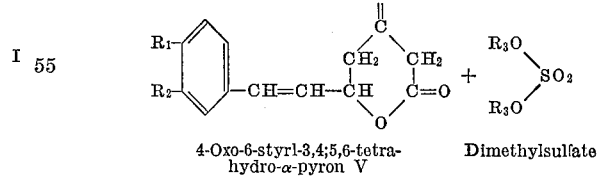

4-Oxo-6-styrl-3,4;5,6-tetrahydro-α-pyron V        Dimethylsulfate

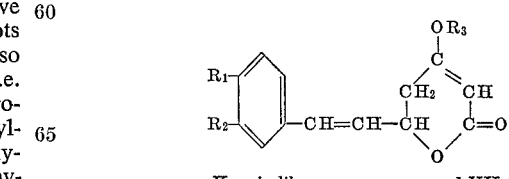

Kawain-like α-pyron compound VII

In said formulas:
R is lower alkyl and preferably ethyl;
$R_1$ is hydrogen or lower alkoxy, preferably methoxy;

$R_2$ is hydrogen, or $R_1$ and $R_2$ form the methylenedioxy group; and $R_3$ is lower alkyl, preferably methyl.

The yield, when proceeding according to the present invention, is surprisingly high. The 4-oxo-6-styryl-3,4;5,6-tetrahydro-α-pyron compound is obtained in a yield between about 60% and about 70% of the theoretical yield.

Bromination of the aceto acetic acid ester with bromo succinimide or the like brominated acid imides proceeds preferably by adding said bromo imide to the aceto acetic acid ester at a temperature between about 100° C. and about 125° C. and preferably at 100° C. to 110° C. The bromo aceto acetic acid ester is separated from the unreacted bromo imide and the resulting imide by a treatment with a suitable solvent. Chlorinated aliphatic hydrocarbons and preferably carbon tetrachloride have proved to be especially suitable for this purpose.

Condensation of the substituted or unsubstituted cinnamic aldehyde with γ-bromo aceto acetic acid ester is preferably carried out in an inert organic solvent. Especially suitable have proved to be water-free aromatic hydrocarbons, preferably benzene.

The condensation is carried out in the presence of zinc. Other metallic catalysts may also be used.

Decomposition of the resulting zinc or other metal complex compounds is effected by means of ammonium chloride which is preferably added in the form of a saturated aqueous solution.

The resulting 4-oxo-6-styryl-3,4;5,6-tetrahydro-α-pyron compounds may also be isolated by precipitating the zinc complex compound and recovering the α-pyron compound from the filtrate by vacuum distillation.

Conversion of said α-pyron compounds into the 4-alkoxy-6-styryl-5,6-dihydro-α-pyron compounds is achieved by reaction with alkoxylating agents, especially with dimethyl sulfate. Thereby, 4-oxo-6-styryl-3,4;5,6-tetrahydro-α-pyron yields kawain; 4 - oxo - 6 - (3'4'-methylenedioxy styryl) - 3,4;5,6 - tetrahydro - α - pyron is converted into methysticin; 4-oxo-6-(4'-methoxy styryl) - 3,4;5,6 - tetrahydro-α-pyron is methoxylated into yangonin. Other kavaα-pyron compounds are also obtainable in a high yield and in a surprisingly pure state.

As stated above, the new 4-oxo-6-styryl-3,4,;5,6-tetrahydro-α-pyron compounds according to the present invention possess the valuable sedative activity of kawain. According to pharmacological tests the convulsion-producing threshold value is higher with the compounds according to the present invention than with the corresponding 4-methoxy-6-styryl-5,6-dihydro-α-pyron compounds, such as kawain. The toxicity of the new compounds is quite low.

The following examples serve to illustrate the present invention without, however, limiting the same thereto.

EXAMPLE 1

γ-Bromo aceto acetic acid ethyl ester 1,170 g. of aceto acetic acid ethyl ester are heated to 100–110° C. 1,605 g. of bromo succinimide are added thereto in protions. The reaction mixture is cooled to room temperature. 300 cc. of carbon tetrachloride are added. After allowing the mixture to stand for 24 hours, the precipitated γ-bromo aceto acetic acid ethyl ester is filtered off by suction. The filter residue is washed with a small amount of carbon tetrachloride. The combined filtrates are distilled in a vacuum at 18 mm. Hg. The first fraction up to 105° C. is discarded. The main fraction distilling between 106° C. and 125° C. is collected. Total yield: 67% of the thoretical yield.

In place of the aceto acetic acid ethyl ester, there may be used equimolecular amounts of the corresponding methyl, propyl, isopropyl, butyl, isobutyl, and other lower alkyl esters of aceto acetic acid. In place of the diluting carbon tetrachloride, there may be employed other halogenated aliphatic hydrocarbons or other inert organic solvents which cause precipitation of the γ-bromo acetic acid ester. N-bromo succinimide may be replaced by other N-brominated acid imides and amides such as N-bromo acetamide, N-bromo phthalimide, dibromo hydantoin, and others.

EXAMPLE 2

4-oxo-6-styryl-3,4;5,6-tetrahydro-α-pyron 1,400 g. of γ-bromo aceto acetic acid ethyl ester and 700 g. of cinnamic aldehyde are dissolved in 500 cc. of benzene. The resulting solution is heated to about 70° C. and is added drop by drop to 350 g. of granular, iodine-activated zinc while stirring. After the addition of the benzene solution the reaction mixture is stirred at about 70° C. for one more hour. Care is taken that the temperature of the reaction mixture does not exceed about 80° C. Thereafter, the resulting condensation product is separated from the zinc complex compound by the addition of petroleum ether whereby said zinc complex compound is filtered off while the filtrate is distilled to dryness is a vacuum yielding 4-oxo-6-styryl - 3,4;5,6 - tetrahydro-α-pyron of the melting point 157° C. The yield is about 70% of the theoretical yield calculated for cinnamic aldehyde used.

EXAMPLE 3

700 g. of γ-bromo aceto acetic acid ethyl ester and 350 g. of cinnatic aldehyde are dissolved in 2500 cc. of benzene. The solution is heated to 75° C. and added drop by drop to 175 g. of granulated zinc which has been activated by mixing zinc granules with a benzene solution of 200 mg. of iodine and heating the mixture, while stirring, to a temperature of about 70° C. until benzene and iodine are completely evaporated. The zinc granules are continuously stirred during addition of the solution. Care is taken by outside cooling that the temperature of the reaction mixture does not exceed about 80° C. and is preferably kept at 70° C. Usually the addition is completed within one hour, whereafter the reaction mixture is stirred for one more hour. Thereby, the zinc is completely dissolved in the solution in the form of a complex compound.

The reaction mixture is then diluted by the addition of 1250 cc. of benzene which was heated to 70° C. before addition, and the thus diluted mixture is kept at 70° C. for one more hour. After cooling to room temperature, the mixture is poured into about the same volume of a saturated aqueous ammonium chloride solution while shaking vigorously. On standing, an aqueous layer containing the zinc salts and impurities and a supernatant organic solvent layer separate. The organic solvent layer is dried over magnesium sulfate, filtered, washed with benzene, and evaporated to dryness. The residue is recrystallized from methanol and the recrystallized 4-oxo-6-styryl-3,4;5,6-tetrahydro-α-pyron melts at 157° C. Yield: 68% of the theoretical yield.

EXAMPLE 4

The procedure is followed as described in Example 3, whereby, however, the equimolecular amount of 3,4-methylenedioxy cinnamic aldehyde is reacted in place of cinnamic aldehyde. 4-oxo-6-(3',4'-methylenedioxy styryl)-3,4;5,6-tetrahydro-α-pyron is obtained in a yield of about 65% of the theoretical yield.

EXAMPLE 5

The procedure is followed as described in Example 2, whereby, however, the equimolecular amount of 4-methoxy cinnamic aldehyde is reacted in place of cinnamic aldehyde. 4-oxo-6-(4'-methoxy styryl)-3,4;5,6-tetrahydro-α-pyron is obtained in a yield of about 67% of the theoretical yield.

In place of benzene, there can be used tetrahydrofuran or other inert organic solvents which have a boiling point between about 70° C. and about 80° C. It is also possible to use higher boiling inert organic solvents. However, the use of benzene and the like low boiling solvents is preferred because their evaporation at the reaction tempera-

EXAMPLE 6

Methoxylation of 4-oxo-6-styryl-3,4;5,6-tetrahydro-α-pyron

A mixture of 2,100 g. of 4-oxo-6-styryl-3,4;5,6-tetrahydro-α-pyron, 1,500 g. of dimethylsulfate, 500 g. of potassium carbonate, and 4,000 cc. of methyl ethyl ketone are boiled under reflux for 8 hours. After cooling and filtering off the residue, the filtrate is washed until neutral, concentrated by evaporation in a vacuum, and the residue is dissolved in methanol while heating. Pure kawain, i.e. 4-methoxy-6-styryl-5,6-dihydro-α-pyron crystallizes. Yield: 60% of the theoretical yield calculated for the amount of 4-oxo-6-styryl-3,4;5,6-tetrahydro-α-pyron used.

When using, in place of 4-oxo-6-styryl-3,4;5,6-tetrahydro-α-pyron, the equimolecular amount of 4-oxo-6-(3′,4′-methylenedioxy styryl)-3,4;5,6-tetrahydro-α-pyron or of 4-oxo-6-(4′-methoxy styryl)-3,4;5,6-tetrahydro-α-pyron and proceeding otherwise as described in Example 6, the corresponding 4-methoxy-5,6-dihydro-α-pyron compounds are obtained in a yield of about 60% of the theoretical yield.

Other methoxylating agents such as ethereal diazomethane solution may also be used. Methoxylation with dimethylsulfate is preferably carried out in solution in a lower aliphatic ketone and most advantageously in methyl ethyl ketone.

The new 4-oxo-6-styryl-3,4;5,6-tetrahydro-α-pyron compounds according to the present invention are used in therapy in the form of pharmaceutical compositions which contain said compounds together with a pharmaceutical carrier or excipient. Suitable compositions are orally administered in the form of powders, tablets, dragees, lozenges, or other solid shaped preparations. Liquid compositions or suppositories can also be used.

Preparations to be administered orally are obtained, for instance, by diluting the active compounds with a solid pulverulent extending agent or pharmaceutical carrier to form an intimate mixture thereof. The components of said mixture are, for instance, intimately mixed in a ball mill or the like device to the desired degree of fineness, or the finely powdered solid carrier is impregnated with a solution of said compound in water or in other suitable solvents, whereafter the water or solvent is removed by evaporation, preferably while milling.

Tablets, pills, dragees, and the like compressed and shaped preparations are prepared by using the commonly employed diluting agents, binders, and the like additives, such as sugar, lactose, talc, starch, bolus alba, pectin; as binders gelatin, gum arabic, methyl cellulose, yeast extract, agar, tragacanth; as lubricants, stearic acid, magnesium stearate, and others.

The compositions according to the present invention are presented for administration in the form of dosage units, each dosage unit being adapted to supply a single dose of active ingredient required for providing the desired therapeutic effect. Preferred dosage unit compositions contain between about 25 mg. and about 100 mg. of the active 4-oxo-6-styryl-1,3,4;5,6-tetrahydro-α-pyron compound. The daily dose administered orally is between about 25 mg. and about 500 mg. of the essential active agent and is preferably between 50 mg. and 150 mg.

Of course, many changes and variations in the reactants, the catalysts, the solvents, in the reaction conditions, temperature, and duration, in the methods of isolating and purifying the reaction products, and the like may be made by those skilled in the art in accordance with the principles set forth herein and in the claims annexed hereto.

I claim:

1. In a process of producing a 4-oxo-6-styryl-3,4;5,6-tetrahydro-α-pyron compound, the steps which comprise condensing a γ-bromo aceto acetic acid lower alkyl ester with a cinnamic aldehyde compound of the formula

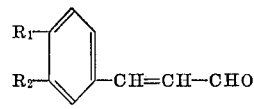

wherein $R_1$ is a member selected from the group consisting of hydrogen and lower alkoxy; and $R_2$ is a member selected from the group consisting of hydrogen and $R_1$ and $R_2$ together form the methylenedioxy group, in the presence of activated zinc in an inert organic solvent and separating the resulting condensation produce from the condensation reaction solution.

2. The process according to claim 1, wherein the condensation is carried out at a temperature between about 70° C. and about 80° C.

3. The process according to claim 1 wherein the organic solvent is a solvent boiling between about 70° C. and about 80° C.

4. The process according to claim 1, wherein the solvent is benzene.

5. The process according to claim 1, wherein the condensation product is separated from the condensation mixture by decomposing the zinc complex compound by the addition of an aqueous ammonium chloride solution and by recovering the condensation product from the organic solvent layer.

6. The process according to claim 1, wherein the cinnamic aldehyde compound is cinnamic aldehyde and the resulting condensation product is 4-oxo-6-styryl-3,4;5,6-tetrahydro-α-pyron.

7. The process according to claim 1, wherein the γ-bromo aceto acetic acid lower alkyl ester is γ-bromo aceto acetic acid ethyl ester.

8. In the process of producing kawain and kawain-like α-pyron compounds, the steps which comprise condensing a γ-bromo aceto acetic acid lower alkyl ester with a cinnamic aldehyde compound of the formula

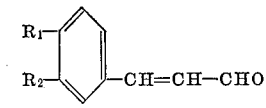

wherein $R_1$ is a member selected from the group consisting of hydrogen and lower alkoxy; and $R_2$ is a member selected from the group consisting of hydrogen and $R_1$ and $R_2$ together form the methylenedioxy group, in the presence of activated zinc in an inert organic solvent, separating the resulting condensation product from the condensation reaction solution, reacting the resulting 4-oxo-6-styryl-3,4;5,6-tetrahydro-α-pyron compound with a methoxylating agent, and separating the resulting 4-methoxy-6-styryl-5,6-dihydro-α-pyron compound from the methoxylating mixture.

9. The process according to claim 8, wherein the methoxylating agent is dimethylsulfate in solution in a lower aliphatic ketone.

10. The process according to claim 9, wherein the lower aliphatic ketone is methyl ethyl ketone.

(References on following page)

References Cited

Borsche et al., Ber. Deut. Chem. vol. 65, pages 820 to 828 (1932).

Elsevier, Chemistry of Carbon Compounds, vol. IV, part B, page 820, Elsevier Publishing Co., N.Y. (1959).

Kostermans; Rec. Trav. Chim. vol. 70, pages 79 to 82 (1951).

Fowler et al.: J. Chem. Soc., 1950, pages 3642 to 3645.

Cavalier; Chemical Reviews, vol. 41, pages 525, 537, 559 to 561 (1947).

Beilstein's Handbuch der Organischen Chemie, vol. 17, pages 516 (system No. 2480), 1933.

JOHN D. RANDOLPH, Primary Examiner

U.S. Cl. X.R.

424—279